United States Patent [19]
Quigley

[11] Patent Number: 5,352,311
[45] Date of Patent: Oct. 4, 1994

[54] METHOD OF MANUFACTURING A COMPOSITE SAIL BATTEN

[75] Inventor: Peter A. Quigley, Cataumet, Mass.

[73] Assignee: Composite Development Corporation, West Wareham, Mass.

[21] Appl. No.: 907,866

[22] Filed: Jul. 2, 1992

[51] Int. Cl.⁵ .................. B63H 9/08; B65H 81/00
[52] U.S. Cl. .................. 156/180; 156/242; 156/245; 156/196; 156/198; 156/221; 114/102; 114/103; 264/136; 264/137; 264/236; 264/296; 264/322
[58] Field of Search .............. 156/166, 180, 245, 242, 156/196, 221, 198; 114/102, 103; 264/136, 137, 296, 209.3, 236, 322

[56] References Cited

U.S. PATENT DOCUMENTS

| | | | |
|---|---|---|---|
| 3,581,698 | 6/1971 | Bete | 114/103 X |
| 3,654,028 | 4/1972 | Goldsworthy | 156/180 X |
| 4,023,801 | 5/1977 | Van Auken | . |
| 4,058,581 | 11/1977 | Park | 156/166 X |
| 4,136,630 | 1/1979 | Fraser | 114/103 X |
| 4,268,561 | 5/1981 | Thompson et al. | . |
| 4,292,368 | 9/1981 | Mialon | 156/198 X |
| 4,487,146 | 12/1984 | Parmentier | 114/102 |
| 4,633,798 | 1/1987 | Skinner et al. | 114/103 X |
| 4,752,513 | 6/1988 | Rau et al. | 156/166 X |
| 4,838,192 | 6/1989 | Stevenson, IV et al. | 114/105 |
| 5,012,755 | 5/1991 | Lockhart et al. | 114/103 |
| 5,026,447 | 6/1991 | O'Connor | 264/296 X |
| 5,056,449 | 10/1991 | Howlett | 114/103 |
| 5,217,555 | 6/1993 | Franklin, III et al. | 156/198 X |

FOREIGN PATENT DOCUMENTS

| | | | |
|---|---|---|---|
| 233129 | 8/1987 | European Pat. Off. | 114/103 |
| 62-157892 | 7/1987 | Japan | 114/103 |
| 965204 | 7/1964 | United Kingdom | 114/102 |

OTHER PUBLICATIONS

Harken Sailmaker Products Brochure/Article, p. 4–2.
Radco Marine Products Brochure, Apr. 1991, pp. 1–9.
Robichaud Batten Systems, Inc. Brochure.
Challenge Sailcloth Hardware Brochure.
Radical Advanced Technology (RATBattens) Brochure & Price List, Feb. 1992.
Apex proto Composites, Inc., 1991 (write-up).
"Which End First;" Deborah Bennet; *Sailing World*, pp. 46–49, Sep. 1992.

*Primary Examiner*—Jeff H. Aftergut
*Attorney, Agent, or Firm*—Lahive & Cockfield

[57] ABSTRACT

A sail batten formed of a fiber reinforced composite material extended longitudinally and varying in transverse cross sectional from an ellipse at one end to a flattened ellipse at the other end. A two step processing for fabrications the batten commences with fabrication of a tube of substantially constant cross section in the thermoplastic condition as a first step. The second step processing heats the tube to a malleable condition and squishes one end of the tube to form a tapered structure with one cross sectional dimension decreased to reduce stiffness in that dimension.

11 Claims, 1 Drawing Sheet

METHOD OF MANUFACTURING A COMPOSITE SAIL BATTEN

BACKGROUND OF THE INVENTION

This invention relates in general to a sail batten construction and a method of manufacturing it, and more particularly to an elongated sail batten structure formed of a fiber reinforced thermoplastic composite material, characterized by a varying stiffness profile along its length.

Sail battens are stiffening elements positioned within pockets or otherwise positioned at the surface of a sail to maintain its airfoil shape under a variety of wind conditions. In its most simple form the batten is an elongated structural member of generally uniform cross sectional dimensions along its length and may be formed of any of a variety of materials exhibiting appropriate strength to weight characteristics. Battens in the past have been formed of wood, fiberglass, and other fiber reinforced composite materials. The airfoil shape desired for the sail includes a curve in the forward section of the sail moving out to a relatively flat section toward the leech of the sail. Ideally, then, the batten should have a variable bending stiffness along its length.

Battens have been formed as solid straight rods which, while strong and inexpensive, have a constant transverse stiffness characteristic over their length and are relatively heavy. Such a solid batten may also have one end ground to a taper, thereby improving the shape characteristic and reducing the weight somewhat, but with a resultant loss of strength. Battens formed of laminated material can be used in a tapered structure exhibiting varying transverse stiffness characteristics along their length. However, laminated structures are expensive to produce.

Similarly the basic construction of a batten may be a hollow tube, rather than a solid rod. A tapering tube is very expensive to produce and straight tubes do not have the desired varying transverse stiffness profile along the length.

It is therefore an object of the present invention to provide a batten formed of a fiber reinforced composite material and having a suitable strength weight characteristic which can be economically produced with a varying transverse stiffness profile over the length of the batten.

Another object of this invention is to provide a method for manufacturing a sail batten of composite material in a first step and thereafter, in a second step, secondary processing that tube to vary its transverse stiffness characteristic along the length of the batten.

It is yet another object of this invention to form a sail batten of a fiber reinforced composite material having a varying transverse stiffness profile along its length, where the stiffness profile is suitable to meet specific airfoil characteristics.

SUMMARY OF THE INVENTION

Broadly speaking the sail batten of this invention is formed of a composite of a polymer matrix together with reinforcing fibers characterized by a varying stiffness characteristic in one transverse dimension along its length, while maintaining a substantially constant cross sectional area. Such a batten is produced by a two-step method in which an initial structure is formed as a rod or tube of substantially constant stiffness and cross section along its length using the pultrusion process. The filaments in the tube or the rod are predominantly axial along the length of the batten and are circumferentially spaced. In the initial step this tube or rod is formed with either a thermoset or a thermoplastic resin. If a thermoset resin is used it is cured in this step to an intermediate "B" stage in which it is partially cross linked and can still become plastic and malleable with the application of further heat prior to full and irreversible cross-linking. Suitable materials for a thermoplastic plastic matrix include, but are not limited to, nylon or polypropylene.

In the second step of manufacture, the tube or rod of substantially uniform transverse stiffness along its length is heated to a temperature at which it becomes malleable in a suitable mold and squished to change its dimension on a transverse axis at specific points along its length, thereby creating a batten characterized by a substantially uniform cross sectional area and weight, but having a varying stiffness profile along its length.

In this process, the squishing reduces the cross sectional diameter along one axis with a corresponding increase in cross sectional diameter along the transverse axis normal to that axis.

DESCRIPTION OF PREFERRED EMBODIMENTS

As indicated above, the sail batten of this invention is formed of a composite resin and fiber capable of secondary processing. The composite article formed in the initial step of the two step process is generally elongate and may have various cross sectional tubular or hollow profiles such as circular, elliptical, rectangular, square and the like. The composite is constructed of continuous high strength reinforcing filaments which are embedded in a polymer material. Suitable processes for forming such articles are known in the art. One such process is a pultrusion process. A detailed method for manufacturing the initial article is described in U.S. Pat. No. 5,048,441, filed Jun. 1, 1989, and incorporated herein by reference.

The matrix material is that portion of the structure excluding the fibers. Typically, the matrix has as its major component a thermoset or thermoplastic resin able to penetrate and bond well to the fiber component. If a thermoset resin is used, it is cured to an intermediate "B" stage. (A "B" stage thermoset polymer is partially cross-linked, and will still become plastic and malleable with the application of heat.) A thermoplastic matrix, such as nylon or polypropylene, can also be used.

Figure 1:
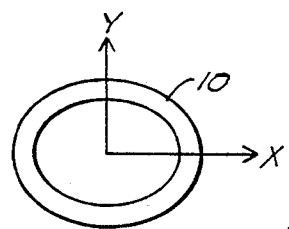
FIGS. 1 and 1a are illustrations of cross sectional and side views of a suitable tube for the process of the invention before secondary processing.

FIG. 1 illustrates in cross section a batten tube 10 of elliptical shape prior to secondary processing. A suitable material is nylon 6 with glass, carbon, aramid or a combination of these as fibers.

Figure 1A:
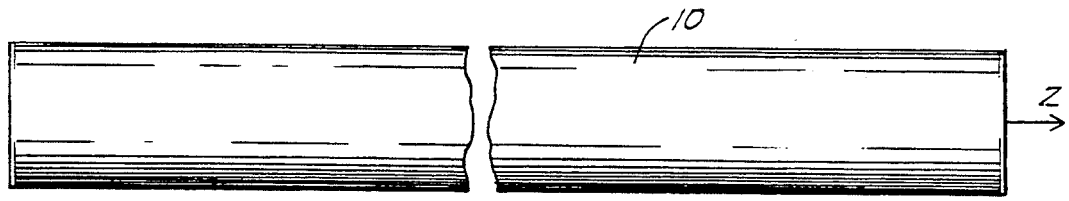

FIG. 1A is a side view of this tube and is shown with a uniform lengthwise profile.

The secondary processing deforms the tubular structure 10 shown in FIGS. 1 and 1A to provide for a cross section which has varying cross sectional dimensions as a function of length, while maintaining the cross sectional area constant. This is accomplished by placing the tube in a heated mold at a temperature which renders the matrix malleable and squishing it to produce the desired taper on the y axis, thereby reducing stiffness in the y dimensions with the taper.

Figure 2:
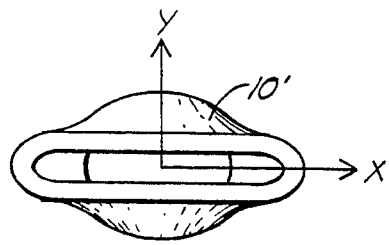
FIGS. 2 and 2a are illustrations, also in cross sectional view and side views, of the same structural member after secondary processing into a tapered cross section along one transverse axis.
Figure 2A:

FIGS. 2 and 2A illustrate the batten 10' of this invention after secondary processing with the y dimension tapering from the initial elliptical geometry at one end 12 to the flattened cross section at the other end 13.

As discussed previously, for a batten, it is desirable to have a gradual decrease in stiffness along the y axis over its length. Squishing reduces the cross sectional diameter along the y axis, with a corresponding increase in the cross sectional diameter along the x axis, while maintaining the cross sectional area of the structure constant. Stiffness along the y axis is reduced as the cross sectional diameter in the y direction decreases. The section's moment of inertia is governed by the following:

$$I_x = ky\,x^3,$$

where
$k$ = constant dependent on section shape,
where
$y$ is the dimension along the y axis, and $x$ is the dimension along the x axis.

Figure 3:
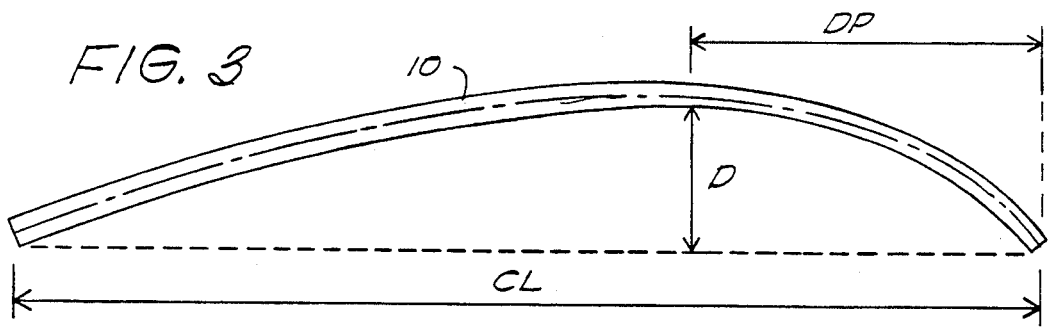
FIG. 3 is an illustration of a sail batten compressed into an airfoil shape.

The desirable profile of batten stiffness and stiffness distribution are determined by the function it performs in the airfoil shape of the sail. The appropriate dimensions for the lengthwise compressed batten are illustrated in FIG. 3. If draft position (DP) = distance from the leading edge of the sail to the area of maximum draft, and draft (D) = amount of maximum draft, and the chord length of the sail = CL, then DP % = DP/CL * 100. Similarly, D % = D/CL * 100. Optimum sail shape and hence desired deflected batten shape is achieved with a maximum draft position that is between 25% and 50% aft of the leading edge of the sail. At the designed compressive load on the batten, the amount of desired deflection of the batten, when subjected to axial load and evenly distributed transverse restraining force (from the sail), is between 15% and 40%. From these figures and the above equations and employing generally acceptable engineering practice, it is possible to define and produce desired profiles of batten cross sections.

Having described the batten and process of manufacture for a specific embodiment, variations will also be apparent.

I claim:

1. A method of manufacture of a sail batten comprising the steps of
   (a) fabricating an initial batten structure of thermoplastic fiber reinforced composite material elongated along a first axis, and
   (b) heating at least one longitudinal portion of said fabricated structure to a plastic condition and flattening said portion in its plastic condition to selectively decrease stiffness in a direction generally transverse to said first axis along said first axis for attaining a selected sail-configuring stiffness, thereby to form said initial structure into a batten having a predetermined variation, along said first axis, in stiffness in said transverse direction.

2. A method in accordance with claim 1 wherein said fabricated structure is a hollow tube of generally elliptical cross section transverse to said first axis.

3. A method in accordance with claim 1 wherein the cross sectional area of said structure is maintained constant along said first axis in step (b).

4. A method in accordance with claim 2 wherein said tube is fabricated with reinforcing fibers extending generally in the direction of said first axis.

5. A method in accordance with claim 4 wherein said tube is formed in a pultrusion process.

6. A method of manufacture of a sail batten comprising the steps of
   (a) fabricating a structure of thermoplastic fiber reinforced composite material elongated along a first axis, and
   (b) heating at least one longitudinal portion of said fabricated structure to a plastic condition and flattening said portion in its plastic condition to selectively decrease stiffness in a direction generally transverse to said first axis along said first axis, whereby said batten has a predetermined variation in stiffness in said transverse direction along said first axis, and
   wherein the variation in stiffness along the first axis is such that under compression the position of maximum deflection of said batten, with respect to the stiffest end of said batten, expressed as a percentage of a length defined as a straight line between the two ends of said batten, is between about 50% and 80%.

7. A method as in claim 6 wherein the amount of maximum deflection expressed as a percentage of said straight line length is between about 15 and 40%, when said batten is subjected to axial load and evenly distributed transverse restraining forces.

8. A method of manufacture of a sail batten comprising the steps of
   (a) fabricating an initial batten structure of thermoset polymer elongated along a first axis,
   (b) curing said thermoset polymer to a condition wherein it can be heated to a plastic condition, and
   (c) thereafter heating a longitudinal portion of said fabricated structure to a plastic condition and flattening said portion in its plastic condition to selectively decrease stiffness in a direction generally transverse to said first axis along said first axis for attaining a selected sail-configuring stiffness, thereby to form said initial batten structure into a batten having a predetermined variation, along said first axis, in stiffness in said transverse direction.

9. A method in accordance with claim 8 wherein said fabricated structure is a hollow tube having a generally elliptical cross section transverse to said first axis.

10. A method of manufacture of a sail batten comprising the steps of
    (a) fabricating a structure of thermoplastic fiber reinforced composite material elongated along a first axis,
    (b) determining a selected variation, along said first axis, of stiffness of said structure generally transverse to said first axis for allowing a selected sail-configuring deflection of said structure, and
    (c) heating at least one longitudinal portion of said fabricated structure to a plastic condition and flattening said portion in its plastic condition according to said determined stiffness variation, thereby to form said structure into a sail batten having a predetermined variation, along said first axis, in stiffness in said transverse direction.

11. A method of manufacture of a sail batten comprising the steps of
   (a) fabricating a structure of thermoset polymer elongated along a first axis,
   (b) curing said thermoset polymer to a condition wherein it can be heated to a plastic condition,
   (c) determining a selected variation along said first axis, of stiffness of said structure generally transverse to said first axis for allowing a selected sail-configuring deflection of said structure, and
   (d) heating a longitudinal portion of said fabricated structure to a plastic condition and flattening said portion in its plastic condition according to said determined stiffness variation, thereby to form said structure into a sail batten having a predetermined variation, along said first axis, in stiffness in said transverse direction.

* * * * *